United States Patent
Kinscher et al.

(10) Patent No.: US 8,931,449 B2
(45) Date of Patent: Jan. 13, 2015

(54) FILTER ARRANGEMENT OF A CONTROL VALVE FOR A CAMSHAFT ADJUSTER

(71) Applicant: Schaeffler Technologies AG & Co. KG, Herzogenaurach (DE)

(72) Inventors: Markus Kinscher, Lauf a.d. Pegnitz (DE); Jens Hoppe, Erlangen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 72 days.

(21) Appl. No.: 13/775,331

(22) Filed: Feb. 25, 2013

(65) Prior Publication Data
US 2013/0228143 A1 Sep. 5, 2013

(30) Foreign Application Priority Data
Mar. 5, 2012 (DE) .......................... 10 2012 203383

(51) Int. Cl.
| F01L 1/34 | (2006.01) |
| F01L 1/344 | (2006.01) |
| B01D 29/11 | (2006.01) |
| F15B 13/04 | (2006.01) |
| F15B 21/04 | (2006.01) |

(52) U.S. Cl.
CPC ............ F01L 1/344 (2013.01); B01D 29/112 (2013.01); F15B 13/0401 (2013.01); F15B 21/041 (2013.01); F01L 2001/34426 (2013.01); F01L 2001/3444 (2013.01)

USPC .......................................... 123/90.17; 210/232

(58) Field of Classification Search
CPC ................... B01D 29/112; F01L 1/344; F01L 2001/3444; F01L 2001/34426; F15B 21/041; F15B 13/0401
USPC .......................... 123/90.17; 210/232, 495, 499
See application file for complete search history.

(56) References Cited

U.S. PATENT DOCUMENTS

| 5,169,524 A | 12/1992 | Meiritz et al. |
| 7,041,217 B1 | 5/2006 | Close et al. |
| 2003/0226593 A1* | 12/2003 | Okada et al. .................. 137/550 |
| 2011/0084018 A1 | 4/2011 | Hoppe et al. |

FOREIGN PATENT DOCUMENTS

| DE | 9016138 | 2/1991 |
| DE | 102008049052 | 4/2009 |
| EP | 1382807 | 1/2004 |
| WO | 2010118930 | 10/2010 |
| WO | 2011032539 | 3/2011 |

* cited by examiner

Primary Examiner — Zelalem Eshete
(74) Attorney, Agent, or Firm — Volpe and Koenig, P.C.

(57) ABSTRACT

A filter arrangement (2) of a control valve (1) for a camshaft adjuster is provided in which the filter arrangement (2) has a filter (3) and a frame (4) with two articulated legs (5, 6) that are each provided with a change in cross section in a peripheral direction (10), so that the resistance to bending moments of each of the legs (5, 6) is constant along the entire leg (5, 6).

10 Claims, 4 Drawing Sheets

FILTER ARRANGEMENT OF A CONTROL VALVE FOR A CAMSHAFT ADJUSTER

INCORPORATION BY REFERENCE

The following documents are incorporated herein by reference as if fully set forth: German Patent Application No.: 102012203383.1, filed Mar. 5, 2012.

FIELD OF THE INVENTION

The invention relates to a filter arrangement of a control valve for a camshaft adjuster.

BACKGROUND

Camshaft adjusters are used in internal combustion engines for varying the control times of the combustion chamber valves, in order to be able to variably shape the phase relation between a crankshaft and a camshaft in a defined angular range between a maximum advanced position and a maximum retarded position. The adjustment of the control times to the current load and rotational speed reduces consumption and the emissions. For this purpose, camshaft adjusters are integrated in a drive train by which a torque is transmitted from the crankshaft to the camshaft. This drive train can be formed, for example, as a belt drive, chain drive, or gearwheel drive.

In a hydraulic camshaft adjuster, the driven element and the drive element form one or more pairs of pressure chambers that act opposite each other and can be pressurized with hydraulic medium. The drive element and the driven element are arranged coaxially. By filling and emptying individual pressure chambers, a relative movement is generated between the drive element and the driven element. The spring causing rotation between the drive element and the driven element forces the drive element in a preferred direction opposite the driven element. This preferred direction can be in the same direction or the opposite direction relative to the direction of rotation.

One structural type of hydraulic camshaft adjuster is the vane cell adjuster. The vane cell adjuster has a stator, a rotor, and a drive wheel with external teeth. The rotor is constructed as a driven element that can usually be locked in rotation with the camshaft. The drive element includes the stator and the drive wheel. The stator and the drive wheel are locked in rotation with each other or are alternatively formed integrally with each other. The rotor is arranged coaxial to the stator and within the stator. Together with their vanes extending in the radial direction, the rotor and the stator form oil chambers that act in opposite directions and can be pressurized by oil pressure and allow a relative rotation between the stator and the rotor. The vanes are formed either integrally with the rotor or the stator or are arranged as "inserted vanes" in grooves of the rotor or the stator provided for this purpose. The vane cell adjusters further have various sealing covers. The stator and the sealing covers are secured with each other by several threaded connections.

Another structural type of hydraulic camshaft adjuster is the axial piston adjuster. Here, a displacement element is shifted in the axial direction by the oil pressure, wherein this displacement element generates a relative rotation between a drive element and a driven element via helical teeth.

The control valves of the hydraulic camshaft adjuster control the flow of hydraulic medium between the camshaft adjuster and the oil pumps or the oil reservoir (tank).

The control valve has a housing and a control piston. Within the housing of the control valve there is the control piston. The control piston can move in the axial direction and is guided by the housing. Thus, the control piston can be positioned relative to the housing in any axial position. The positioning is realized by an electromagnet that contacts, with its actuation pin, one end of the control piston and can move the control piston. A spring secures the contact between the control piston and the actuation pin. Through the axial positioning of the control piston, the different connections of the control valve are connected hydraulically to each other or separated from each other and thus can communicate with each other or not. For guiding the hydraulic medium between the connections, the control piston and housing are provided with openings, e.g., grooves and/or holes. The control piston has control edges that control the flow rate together with the edges of the openings of the housing. The control edges themselves are the edges of the respective opening, e.g., grooves, of the control piston. For controlling the flow rate, the edges of the openings of the housing and the control edges are positioned relative to each other such that an opening of the housing stands largely opposite an opening of the control piston and forms a variable flow rate area for the hydraulic medium by the ability to position the control piston.

A central valve constructed as a control valve is arranged coaxial to the axis of symmetry or rotation of the camshaft adjuster or the camshaft. In addition, the central valve is placed within the camshaft adjuster, i.e., the central valve and camshaft adjuster are built one on top of the other in the radial direction. Optionally, between the camshaft adjuster and the central valve there can be the camshaft. The housing of the central valve can be formed as a central screw, by which the camshaft adjuster is locked in rotation with the camshaft. The electromagnet is arranged as a central magnet largely flush with the central valve and is arranged usually fixed on a frame, in particular, on the cylinder head.

Alternatively, a control valve with an electromagnet fixed rigidly on this valve could be arranged on any position in the hydraulic medium circuit outside of the camshaft adjuster and the camshaft and could control the hydraulic medium flow.

DE 10 2008 049 052 A1 discloses a valve with a filter for capturing foreign matter in the hydraulic medium, here oil. The filter thus should prevent the entrance of foreign matter into the valve. Furthermore a filter band is disclosed that has a band-shaped frame element. On the surface of the frame element there are several grooves spaced apart from each other.

WO 2011/032539 shows a filter for liquid or gaseous medium. The filter has a frame that is present as a ring in the closed state. The frame has an advantage of first and second sections with differing material strengths or thicknesses.

SUMMARY

The object of the present invention is to provide a filter arrangement of a control valve for a camshaft adjuster that can be installed in an especially reliable way.

According to the invention, a filter arrangement of a control valve for a camshaft adjuster is characterized in that a flow of hydraulic medium to the camshaft adjuster is controlled by the control valve and the filter arrangement is placed on the control valve such that the flow of hydraulic medium passes the filter arrangement, wherein the filter arrangement has a filter and a ring-shaped frame, wherein the filter is held by the ring-shaped frame on the control valve and the ring-shaped frame has two legs that are moved about a joint of the frame, so that the ends of the two legs are connected to each other, characterized in that the cross section of a leg, with increasing angle in the peripheral direction, is subject to a, in particular, exactly one single, constant and continuous change that is adapted to the resulting bending tension of the entire leg, such that the entire leg has a constant resistance to bending moment. The cross-sectional profile formed in this way is especially advantageous with the occurrence of a bending load, especially during installation. The leg is thus deformed uniformly at least during installation and forms a uniform contact with its receptacle on the control valve.

In this way it is achieved that, when the ends of both legs are connected, the legs remain largely without deformation or true to shape. Thus the stability of the leg with the constant and continuous change in cross section is given during installation and twisting or torsion is avoided. Furthermore, the half-shell-shaped formation of the leg is advantageously preserved both before and also after the installation, wherein the frame and thus also the filter arrangement form a uniform, peripheral contact on the control valve.

Alternatively, the cross sections of the two legs, each with an increasing angle in the peripheral direction, are subject to a constant and continuous change, so that the cross-sectional profile in the peripheral direction is adapted to the resulting bending tension of each leg, such that both legs each have a constant resistance to bending moment. Ideally, the resistance to bending moment is equal in both legs.

In one construction of the invention, a dimension of the cross section, with increasing angle in the peripheral direction, is subject to a, in particular, exactly one change in a, in particular, exactly one axial direction.

Alternatively, the one dimension of the cross section, with increasing angle in the peripheral direction, is subject to a change in both axial directions.

In one advantageous construction, an axial end face of the leg is formed planar. The planar, axial end face is advantageously orthogonal to the rotational axis. The planar end face is provided for contact of the filter arrangement with the receptacle on the control valve, wherein the axial position of the filter arrangement relative to the control valve is fixed.

In one preferred construction, the two end faces of the leg are arranged parallel to each other. Here, the filter arrangement is fixed in two axial directions. Ideally, the filter arrangement is arranged in a receptacle formed as a groove on the control valve.

In one construction of the invention, a dimension of the cross section, with increasing angle in the peripheral direction, is subject to a change in the axial direction and this cross-sectional change is formed in the area of one of the openings of the frame. This influences the flexibility and thus the formation of a constant resistance to bending moment with increasing angle in the peripheral direction.

In one preferred construction, a dimension of the cross section, with increasing angle in the peripheral direction, is subject to a, in particular, exactly one change in a, in particular, exactly one radial direction.

Alternatively, the dimension of the cross section, with increasing angle in the peripheral direction, is subject to a change in both radial directions. A combination of the changes of the cross section in the axial and radial directions is conceivable.

In one construction of the invention, the change of the cross section, with increasing angle in the peripheral direction, is formed by the half of the leg that connects to the joint. Here, the cross-sectional profile is formed completely along this half of the leg.

In one advantageous construction, the change of the cross section, with increasing angle in the peripheral direction, is formed by the half of the leg that connects to the end that is provided for connection to the end of the other leg. Here, the cross-sectional profile is formed completely along this half of the leg.

In one advantageous formation, the change of the cross section, with increasing angle in the peripheral direction, is formed by round sections in the opening of the frame. The round sections are advantageously arranged in the corners of the opening. For this purpose or alternatively, round sections of the profile can be formed in the cross section of the area of the opening, i.e., the edges in the peripheral direction are rounded with a constant radius, advantageously with a radius that changes in the peripheral direction.

In one formation of the invention, a control valve for a camshaft adjustment system has a filter arrangement according to the invention. The filter arrangement is arranged in a receptacle of the control valve. By connecting the ends of the legs during installation, the ring-shaped frame is closed and the filter arrangement is placed captively in the receptacle. For transporting the hydraulic medium between a camshaft adjuster and the control valve, a hydraulic medium gallery is provided.

Through the formation of the cross-sectional profile of the leg according to the invention in the peripheral direction of the leg or the frame, a bending tension that is constant throughout the periphery is achieved and thus the deformation during the installation is minimized.

DETAILED DESCRIPTION OF THE PREFERRED EMBODIMENTS

Figure 1:
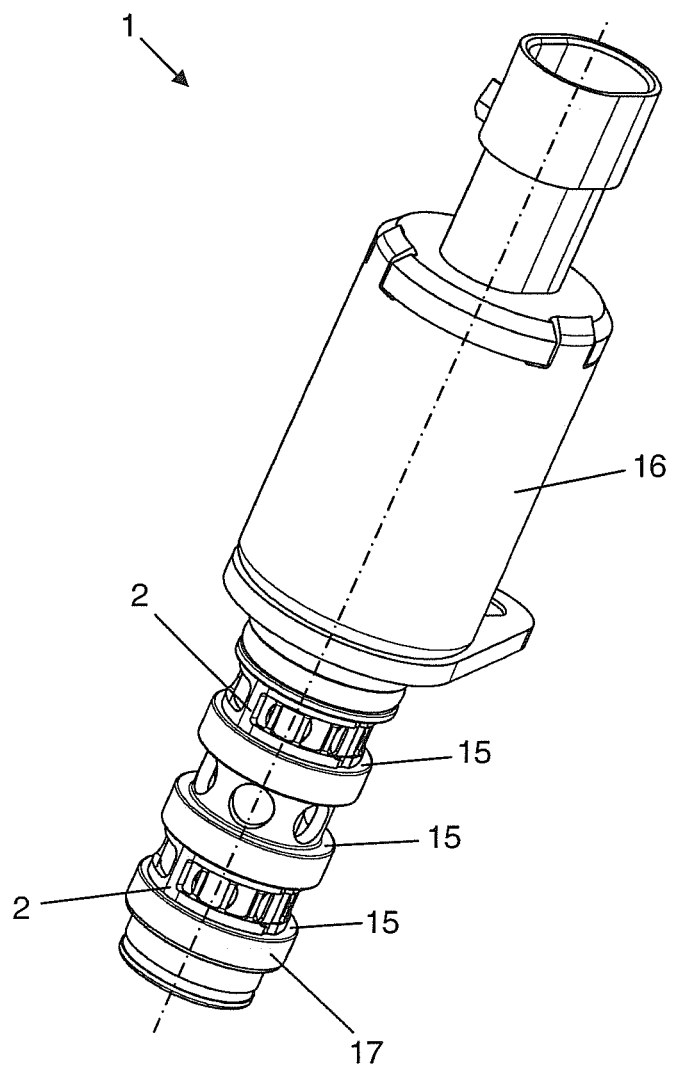
FIG. 1 is a view of a control valve for a camshaft adjustment system with the filter arrangement according to the invention.

FIG. 1 shows a control valve 2 for a camshaft adjustment system with the filter arrangement 1 according to the invention. Such a control valve 2 has an electromagnet part 16 and a hydraulic part 17. The hydraulic part 17 typically sits in a receptacle of the internal combustion engine and is connected to the hydraulic medium gallery of the camshaft adjustment system. The configuration and function of the control valve and the camshaft adjustment system, especially with a hydraulic camshaft adjuster, is known from the prior art.

The hydraulic part 17 has a groove 15 for holding the filter arrangement 2 on its outer periphery. Three grooves 15 are formed by the hydraulic part 17 and spaced apart from each other in the axial direction. Each groove 15 is allocated to a hydraulic connection (a supply connection, a work connection, or a tank connection). Due to the identically shaped configuration of the grooves 15, the filter arrangement 2 can be advantageously placed in any of the grooves 15.

Figure 2:
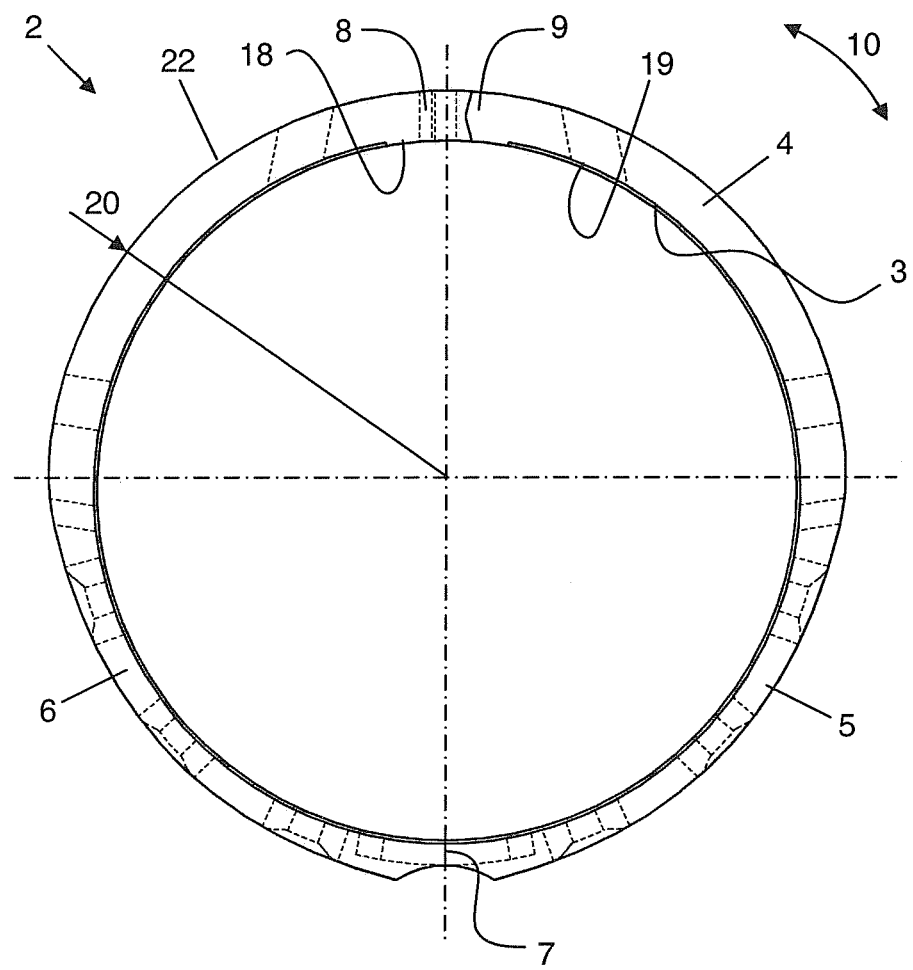
FIG. 2 is a front view of a first construction of a frame of the filter arrangement.

FIG. 2 shows a front view of a first construction of the frame 4 of the filter arrangement 1. The ring-shaped frame 4 is formed of two legs 5, 6 and a joint 7 that is formed in this example as a solid-body joint in the form of a defined material narrowed section. The two ends 8, 9 of the legs 5, 6 are connected to each other, so that the ring-shaped frame 4 has a largely circular inner diameter 18. The inner diameter 18 has an almost completely all-around receptacle 19 for a filter 3. The receptacle 19 is formed by a diameter reduction of the inner diameter 18. In this receptacle 18, a filter 3 is placed. The two end faces 11, 12 that stand opposite each other in the axial direction are formed planar and parallel to each other.

Each leg 5, 6 is divided into two halves. The half that faces the joint 7 has a constant and continuous change of its cross section according to the invention with the increasing angle in the peripheral direction 10. This change is formed in the radial direction, wherein the radial distance 20 of the outer periphery 22 of the frame 4 is reduced and then increased again. The other resulting half that faces the respective end 8, 9 has a constant radial distance 20. The radial distance 20 of the outer periphery 22 of the frame 4 remains constant in this half of each leg 5, 6 with increasing angle.

Figure 3:
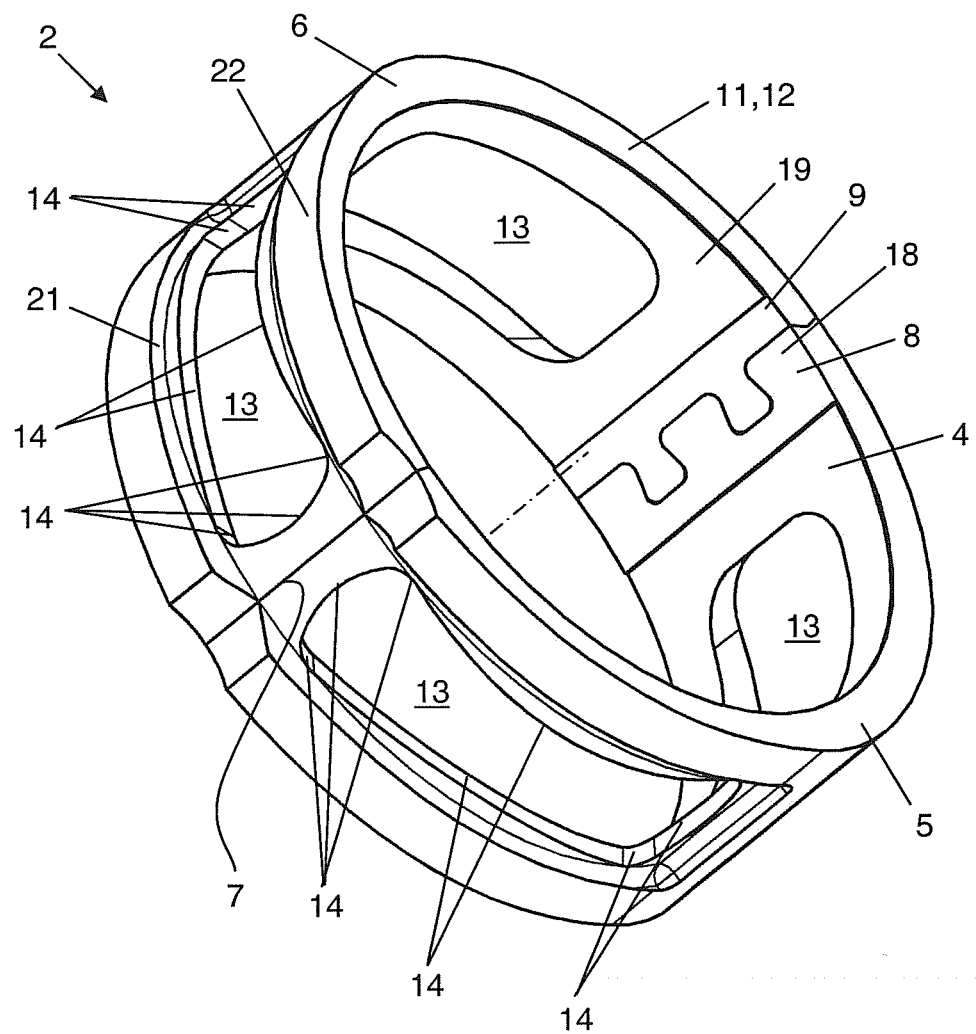
FIG. 3 is a view of a second construction according to the invention of the frame of the filter arrangement.

FIG. 3 shows a second formation of the frame 4 of the filter arrangement 1 according to the invention. The ring-shaped frame 4 consists of two legs 5, 6 and a joint 7 that is formed in this example as a solid-body joint in the form of a defined material reduced section. The two ends 8, 9 of the legs 5, 6 are connected to each other, so that the ring-shaped frame 4 has a largely circular inner diameter 18. The inner diameter 18 has an almost completely all around receptacle 19 for a filter 3. The receptacle 19 is formed by a diameter reduction of the inner diameter 18. In this receptacle 18, a filter 3 is placed. The two end faces 11, 12 that stand opposite each other in the axial direction are formed planar and parallel to each other.

Each leg 5, 6 has two through-flow openings 13. The special feature of this embodiment according to the invention is provided in that the through-flow opening 13 that is formed by the half of the leg 5, 6 that faces the joint 7 has round sections 14, in order to achieve the constant resistance to bending moment over the entire leg 5 or 6. The through-flow openings 13 of this half of each leg 5, 6 are also arranged in a recess 21. The recess 21 is formed offset toward the inside in the radial direction from the outer periphery 22. The round sections 14 have a convex construction on the axial boundary surface of the through-flow opening 13, where, in contrast, the peripheral boundary surfaces of the through-flow opening 13 have a concave construction. The round sections 14 transition constantly one into the other.

The other resulting half of the legs 5 and 6 that faces the respective end 8, 9 has only rounded corners of the through-flow opening 13. The radial distance 20 of the outer periphery 22 of the frame 4 remains constant in this half of each leg 5, 6 with increasing angle. This embodiment, however, can be combined with the construction according to FIG. 2.

Figure 4:
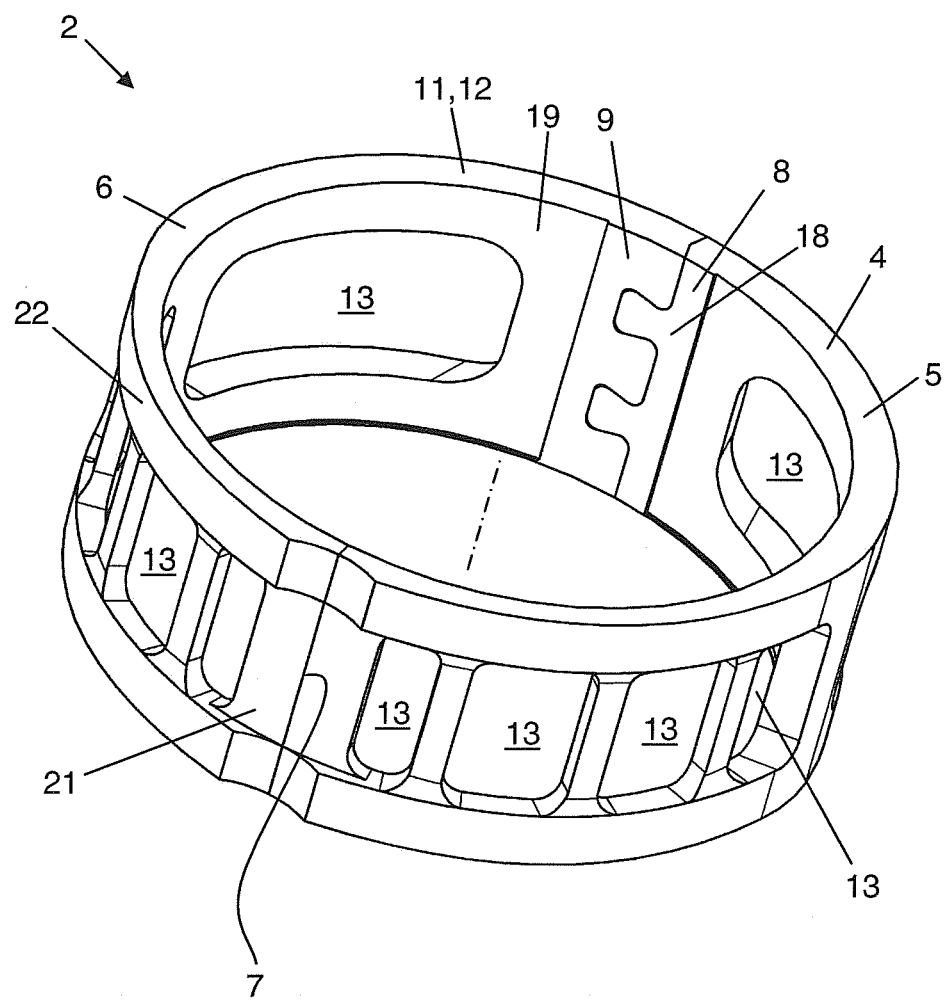
FIG. 4 is a view of a third construction according to the invention of the frame of the filter arrangement.

FIG. 4 shows a third formation of the frame 4 of the filter arrangement 1 according to the invention. The ring-shaped frame 4 is formed of two legs 5, 6 and a joint 7 that is formed in this example as a solid-body joint in the form of a defined material reduced section. The two ends 8, 9 of the leg 5, 6 are connected to each other, so that the ring-shaped frame 4 has a largely circular inner diameter 18. The inner diameter 18 has an almost completely all around receptacle 19 for a filter 3. The receptacle 19 is formed by a diameter reduction of the inner diameter 18. In this receptacle 18, a filter 3 is placed. The two end faces 11, 12 that stand opposite each other in the axial direction are formed planar and parallel to each other.

Each leg 5, 6 has several through-flow openings 13. The special feature of this embodiment according to the invention consists in that, in the half of the leg 5, 6 facing the joint 7, there are several through-flow openings 13 of different through-flow cross sections, in order to achieve the constant resistance to bending moment over the entire leg 5 or 6. The through-flow openings 13 of this half of each leg 5, 6 are not arranged in a recess 21. The recess 21 is formed only in the area of the joint 7.

The other resulting half of the legs 5 and 6 facing the respective end 8, 9 has only one through-flow opening 13 with rounded corners. The radial distance 20 of the outer periphery 22 of the fame 4 remains constant in this half of each leg 5, 6 with increasing angle. This embodiment, however, can be combined with the construction according to FIG. 2.

LIST OF REFERENCE NUMBERS

1) Control valve
2) Filter arrangement
3) Filter
4) Frame
5) Leg
6) Leg
7) Joint
8) End
9) End
10) Peripheral direction
11) End face
12) End face
13) Through-flow openings
14) Round sections
15) Groove
16) Electromagnetic part
17) Hydraulic part
18) Receptacle for filter
19) Inner diameter
20) Radial spacing
21) Recess
22) Outer periphery

The invention claimed is:

1. A filter arrangement of a control valve for a camshaft adjustment system, wherein a flow of hydraulic medium to a camshaft adjuster is controlled by the control valve and the filter arrangement is placed on the control valve such that the flow of hydraulic medium passes the filter arrangement, the filter arrangement comprises a filter and an annular frame, the filter is held by the annular frame on the control valve, the annular frame has through flow openings for the hydraulic medium and the annular frame is divided into two legs that are moveable about a joint of the frame, so that ends of the two legs are connected to each other, a cross section of the legs, along an increasing angle in a peripheral direction, is subjected to a constant and continuous change that is adapted to a resulting bending tension of the entire leg, such that the entire leg has a constant resistance to bending moment.

2. The filter arrangement according to claim 1, wherein a dimension of the cross section, with the increasing angle in the peripheral direction, is subject to a change in an axial direction.

3. The filter arrangement according to claim 1, wherein an axial end face of each of the legs is formed planar.

4. The filter arrangement according to claim 1, wherein two end faces of the legs are arranged parallel to each other.

5. The filter arrangement according to claim 1, wherein a dimension of the cross section, with the increasing angle in the peripheral direction, is subject to a change in the axial direction and the change in cross section is formed in an area of one of the through-flow openings of the frame.

6. The filter arrangement according to claim 1, wherein a dimension of the cross section, with the increasing angle in the peripheral direction, is subject to a change in a radial direction.

7. The filter arrangement according to claim 1, wherein the change of the cross section is formed, with the increasing angle in the peripheral direction, by a half of the leg that connects to the joint.

8. The filter arrangement according to claim 1, wherein the change of the cross section is formed, with the increasing angle in the peripheral direction, by a half of the leg that connects to an end of each of the legs that is provided for connecting to the end of the other leg.

9. The filter arrangement according to claim 1, wherein the change of the cross section is formed, with the increasing angle in the peripheral direction, by round sections in the through-flow opening of the frame.

10. A control valve with a filter arrangement according to claim 1.

* * * * *